(12) United States Patent
Tsuto

(10) Patent No.: US 6,316,783 B1
(45) Date of Patent: Nov. 13, 2001

(54) RADIATION IMAGE READ-OUT APPARATUS

(75) Inventor: Satoru Tsuto, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/568,046

(22) Filed: May 10, 2000

(30) Foreign Application Priority Data

May 10, 1999 (JP) .................................................. 11-128626

(51) Int. Cl.$^7$ ...................................................... G01T 7/00
(52) U.S. Cl. ........................................... 250/585; 250/584
(58) Field of Search .................................... 250/234, 235, 250/584, 585, 586, 587, 208.1

(56) References Cited

U.S. PATENT DOCUMENTS 4,687,352 * 8/1987 Igi et al. ................................. 400/73
5,138,161 * 8/1992 Miyagawa et al. ................ 250/327.2

FOREIGN PATENT DOCUMENTS 5-142685 6/1993 (JP) ................................ G03B/42/02

* cited by examiner

Primary Examiner—Robert H. Kim
Assistant Examiner—Hoon K. Song
(74) Attorney, Agent, or Firm—Sughrue, Mion, Zinn, Macpeak & Seas, PLLC

(57) ABSTRACT

A radiation image read-out apparatus comprises a device for irradiating stimulating rays to a stimulable phosphor sheet, on which radiation image information has been stored, the stimulating rays causing the stimulable phosphor sheet to emit light in proportion to the amount of energy stored thereon during its exposure to radiation. The apparatus also comprises a light guiding system, which is provided with a light guide member and a mirror and which guides the emitted light, and a device for detecting the guided light and thereby reading out the radiation image information. A mirror body provided with the mirror is constituted for rotation. The mirror body has a light guide member dust removing brush, which rotates due to rotation of the mirror body, comes into contact with the light guide member, and removes dust clinging to the light guide member. A mirror dust removing brush comes into contact with the mirror due to rotation of the mirror body and removes dust clinging to the mirror.

13 Claims, 12 Drawing Sheets

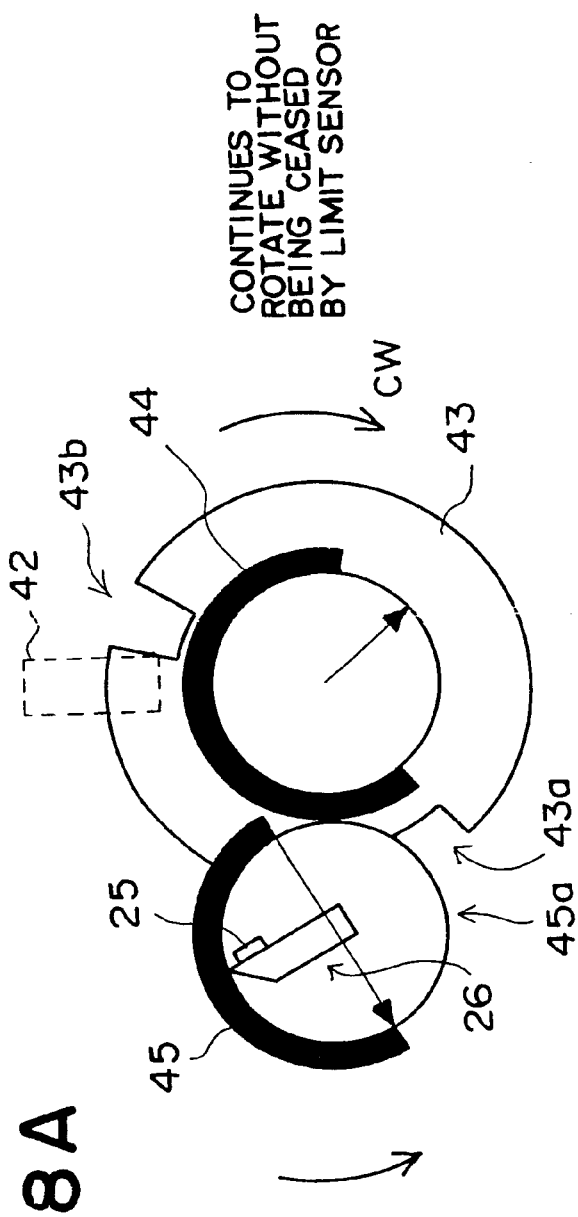
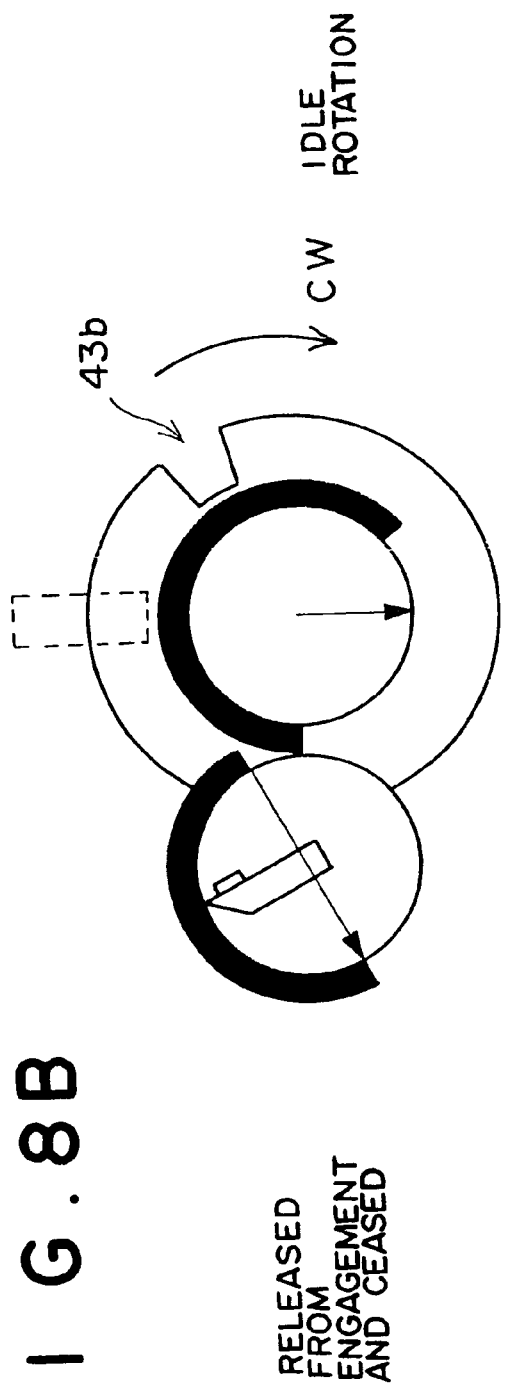
FIG. 8A — RELEASED FROM ENGAGEMENT
FIG. 8B — RELEASED FROM ENGAGEMENT AND CEASED

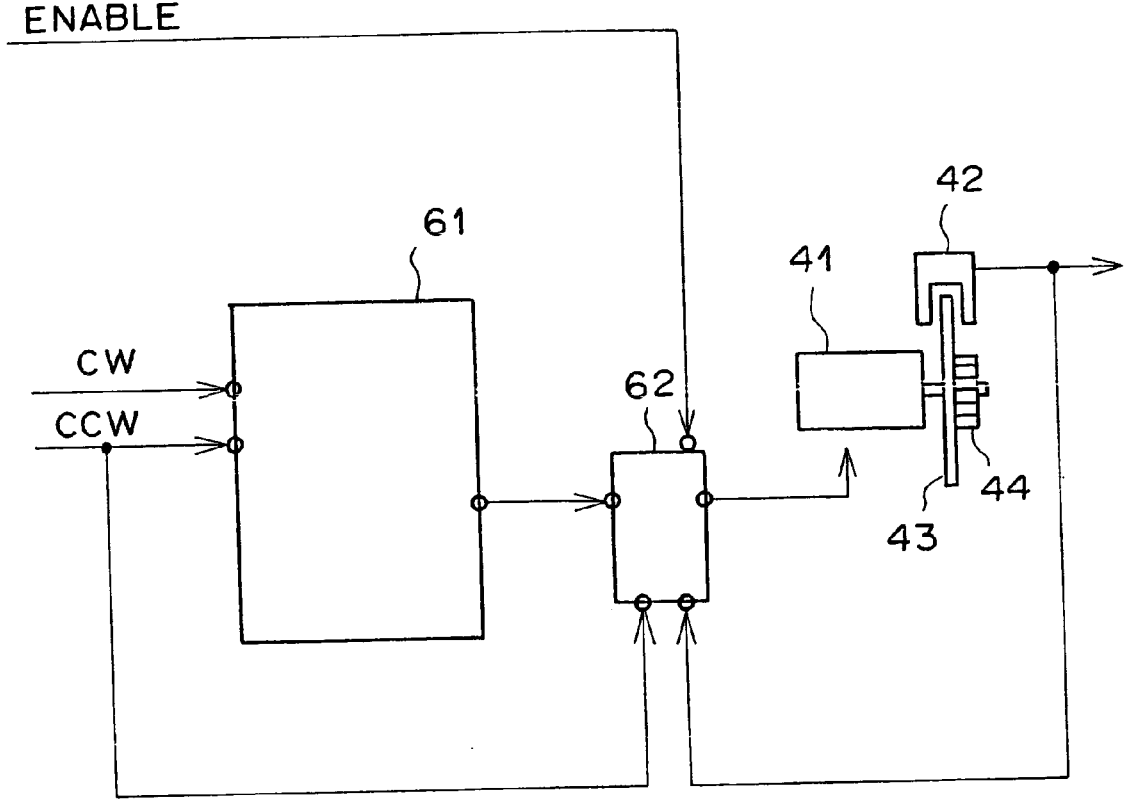
F I G . 9

RELEASED FROM ENGAGEMENT

RELEASED FROM ENGAGEMENT AND SET AT INITIAL POSITION

CONTINUES TO ROTATE WITHOUT BEING CEASED BY LIMIT SENSOR

CEASED BY INTERLOCKING CIRCUIT

RADIATION IMAGE READ-OUT APPARATUS

BACKGROUND OF THE INVENTION

1. Field of the Invention

This invention relates to a radiation image read-out apparatus. This invention particularly relates to a dust removing mechanism in a radiation image read-out apparatus.

2. Description of the Prior Art

There have heretofore been known radiation image read-out apparatuses. With the radiation image read-out apparatuses, radiation image information of an object, such as a human body, is recorded on a stimulable phosphor sheet, which comprises a substrate and a layer of a stimulable phosphor overlaid on the substrate. The stimulable phosphor sheet, on which the radiation image information has been stored, is then exposed to stimulating rays, such as a laser beam, which cause it to emit light in proportion to the amount of energy stored thereon during its exposure to radiation. The light emitted by the stimulable phosphor sheet, upon stimulation thereof, is guided by a light guide member, which is associated with a mirror, and the guided light is photoelectrically converted into an image signal. The stimulable phosphor sheet, from which the image signal has been detected, is then exposed to erasing light, and energy remaining on the stimulable phosphor sheet is released.

The image signal having been obtained with the radiation image read-out apparatuses is subjected to image processing, such as gradation processing or processing in the frequency domain, and a processed image signal is obtained. The processed image signal is utilized for reproducing a visible image on film, a cathode ray tube (CRT) display device, or the like. The stimulable phosphor sheet, which has been erased, can be utilized again for recording radiation image information.

Ordinarily, the radiation image read-out apparatus having the constitution described above is positioned in a light-blocked location (hereinbelow referred to as the light-blocked room), such that weak light emitted by the stimulable phosphor sheet can be guided by a light guiding system utilizing the light guide member, the mirror, and the like. However, the light-blocked room does not block flows of air. Therefore, for example, when the stimulable phosphor sheet is inserted into the light-blocked room and discharged from the light-blocked room, dust enters into the light-blocked room. Dust flutters in the light-blocked room due to movement of a scanning system, heat generated by the stimulating rays, and the like, and accumulates on upward-facing surfaces of the light guide member and the mirror with the passage of time.

Dust having accumulated on the light guiding system often adversely affects the operation for reading out the radiation image information. For example, in order for the light guiding efficiency to be kept high, the spacing between the light guide member and the mirror is set to be markedly narrow. When dust accumulates and grows on the upper surfaces of the light guide member and the mirror, dust projects laterally from edges of the upper surfaces of the light guide member and the mirror. As a result, the stimulating rays, which travel along the optical path between the light guide member and the mirror is intercepted by the projecting dust. In such cases, a predetermined amount of stimulation energy cannot be given to the stimulable phosphor sheet.

In order for the optical path of the stimulating rays to be prevented from being intercepted by dust accumulating on the light guide member and the mirror, the applicant proposed a radiation image read-out apparatus, wherein the inclination angles of the upper surfaces of the light guide member and the mirror are set at large angles, or auxiliary members having upper surfaces set at large inclination angles are located on the upper surfaces of the light guide member and the mirror, such that dust falling toward the upper surfaces of the light guide member and the mirror may not remain thereon and may fall downwardly. The radiation image read-out apparatus is disclosed in Japanese Unexamined Patent Publication No. 5(1993)-142685.

However, with the radiation imageread-out apparatus, wherein the inclination angles of the upper surfaces of the light guiding system are set at large angles, or auxiliary members are located on the light guiding system, dust cannot be perfectly prevented from accumulating on the light guiding system. Also, in the cases of dust, such as waste thread, which is markedly light in weight but has a certain length, it often occurs that dust clings so as to be threaded over between the light guide member and the mirror. In such cases, with the inclination of the upper surfaces of the light guide member and the mirror, dust cannot be caused to fall downwardly. Further, in cases where dust conveyed due to the conveyance of the stimulable phosphor sheet transfers and clings to downward-facing surfaces of the light guide member and the mirror, dust cannot be removed from the downward-facing surfaces of the light guide member and the mirror.

In order for such dust to be removed, it is necessary to perform the operations for disassembling the radiation image read-out apparatus to expose the surfaces to which dust clings, removing the dust, and then assembling the radiation image read-outapparatus. However,the operations for disassembling the parts, which have been adjusted and assembled accurately, and then assembling them again cannot be performed by the users. Also, considerable time and labor are required to perform re-adjustment.

SUMMARY OF THE INVENTION

The primary object of the present invention is to provide a radiation image read-out apparatus, wherein dust clinging to a light guiding system is capable of being removed easily.

Another object of the present invention is to provide a radiation image read-out apparatus, wherein electrostatic charges on a light guiding system are capable of being removed, and dust is capable of being prevented from transferring and clinging to a light guide member and a mirror.

The present invention provides a radiation image read-out apparatus, comprising:

i) means for irradiating stimulating rays to a stimulable phosphor sheet, on which radiation image information has been stored, the stimulating rays causing the stimulable phosphor sheet to emit light in proportion to the amount of energy stored thereon during its exposure to radiation, ii) a light guiding system, which is provided with a light guide member and a mirror and which guides the light emitted by the stimulable phosphor sheet, and iii) means for detecting the guided light and thereby reading out the radiation image information, wherein a mirror body, which is provided with the mirror, is constituted such that it is capable of rotating, and the mirror body is provided with a light guide member dust removing brush, which rotates due to rotation of the mirror body, comes into contact with the light guide member, and removes dust clinging to the light guide member.

The radiation image read-out apparatus in accordance with the present invention should preferably further comprise a mirror dust removing brush, which comes into contact with the mirror due to rotation of the mirror body and removes dust clinging to the mirror.

The term "mirror body" as used herein means the part having the mirror. The mirror body may be constituted of the mirror alone. Alternatively, the mirror body may be constituted of the mirror and a support member for supporting the mirror.

The term "light guide member dust removing brush," as used herein means the brush, which can come into contact with the light guide member and can thereby remove dust clinging to the light guide member. Also, the term "mirror dust removing brush" as used herein means the brush, which can come into contact with the mirror and can thereby remove dust clinging to the mirror. Therefore, for example, the light guide member dust removing brush and the mirror dust removing brush may be constituted of various kinds of animal fur, vegetable fibers, synthetic resin fibers, and the like, which are embedded in a handle, a plate surface, or the like. Alternatively, the light guide member dust removing brush and the mirror dust removing brush may be constituted of any of other kinds of brushes for rubbing and removing dust clinging to the light guide member and the mirror. For example, each of the light guide member dust removing brush and the mirror dust removing brush may be constituted of a markedly thin synthetic resin plate, a sheet of cloth having good effects of removing dust, or the like.

The light guide member, the mirror, and the mirror body, which are formed from a synthetic resin, or the like, may be electrostatically charged and may thereby become apt to attract dust. Therefore, each of the brush part of the light guide member dust removing brush and the brush part of the mirror dust removing brush should preferably have the electrostatic charge removing functions for removing electrostatic charges when the brush part comes into contact with the light guide member, the mirror, or the mirror body. Specifically, a brush such as the one which is ordinarily utilized at a sheet discharging section in a facsimile device, a copying machine, or the like, may be employed as the light guide member dust removing brush or the mirror dust removing brush.

The light guide member dust removing brush may be located at one of various positions on the mirror body, such that the light guide member dust removing brush can rotate due to the rotation of the mirror body, can come into contact with the light guide member, and can remove dust clinging to the light guide member, and such that the light guide member dust removing brush may not intercept the stimulating rays and may not obstruct the guiding of the light emitted by the stimulable phosphor sheet. Also, the mirror dust removing brush may be located at one of various positions, such that the mirror dust removing brush can come into contact with the mirror due to the rotation of the mirror body and can remove dust clinging to the mirror, and such that, as in the case of the light guide member dust removing brush, the mirror dust removing brush may not intercept the stimulating rays and may not obstruct the guiding of the light emitted by the stimulable phosphor sheet.

The rotation of the mirror body and the rotation of the light guide member dust removing brush due to the rotation of the mirror body are the rotations around an arbitrary rotation axis extending along a main scanning direction of the stimulating rays. The rotation of the mirror body may be performed arbitrarily by the user when necessary. Alternatively, when predetermined conditions are satisfied, e.g. when the start or end of the operation of the radiation image read-out apparatus is sensed, the mirror body may rotate automatically, and the brush may automatically remove dust from the light guide member or the mirror.

The radiation image read-out apparatus in accordance with the present invention may be modified such that it is provided with a first gear, which is connected to the mirror body and rotates the mirror body, and a second gear for engagement with the first gear, which second gear is connected to a rotation driving shaft and transmits rotation force to the first gear, and the first gear is provided with a toothless region for preventing the mirror body from undergoing over-rotation.

Also, the radiation image read-out apparatus in accordance with the present invention may be modified such that it is provided with a first gear, which is connected to the mirror body and rotates the mirror body, and a second gear for engagement with the first gear, which second gear is connected to a rotation driving shaft and transmits rotation force to the first gear, and the second gear is provided with a toothless region for releasing engagement of the second gear with the first gear when the mirror body takes a position in the vicinity of an initial position.

Further, the radiation image read-out apparatus in accordance with the present invention may be provided with rotation position detecting means for detecting a position of rotation of the second gear, rotation direction detecting means for detecting a direction of rotation of the second gear, and an interlocking circuit for cutting off driving force, which rotates the second gear, in accordance with the results of the detection of the position of rotation of the second gear and the detection of the direction of rotation of the second gear.

The term "light guide member" as used herein means the member for forming the optical path, along which the light emitted by the stimulable phosphor sheet is guided to photoelectric read-out means. For example, the light guide member may be formed from a light guiding material, such as an acrylic plate. Alternatively, the light guide member may be constituted of an array of a plurality of microlenses or SELFOC lenses.

With the radiation image read-out apparatus in accordance with the present invention, the mirror body is constituted such that it is capable of rotating. The mirror body is provided with the light guide member dust removing brush, which rotates due to rotation of the mirror body, comes into contact with the light guide member, and removes dust clinging to the light guide member. Therefore, the problems can be prevented from occurring in that the light guiding efficiency, with which the light emitted by the stimulable phosphor sheet is guided, becomes low due to dust.

Specifically, in cases where, for example, the relationship between the light guide member and the light guide member dust removing brush is set appropriately, dust clinging to the upward-facing surface of the light guide member and the downward-facing surface of the light guide member (i.e., the light input face of the light guide member) can be removed forcibly by the light guide member dust removing brush. Therefore, dust can be removed reliably, and the problems can be prevented from occurring in that the light guiding efficiency, with which the light emitted by the stimulable phosphor sheet is guided, becomes low due to dust.

With the radiation image read-out apparatus in accordance with the present invention further comprising the mirror dust removing brush, which comes into contact with the mirror due to rotation of the mirror body and removes dust clinging to the mirror, dust clinging to the mirror surface and intercepting the optical path of the light emitted by the stimulable phosphor sheet can be removed forcibly by the mirror dust removing brush. Therefore, dust removal can be performed reliably. As a result, the optical path of the light emitted by the stimulable phosphor sheet can be kept free from adverse effects of dust, and the emitted light carrying image information stored on the stimulable phosphor sheet can be guided reliably.

With the radiation image read-out apparatus in accordance with the present invention, wherein the light guide member dust removing brush or the mirror dust removing brush has the electrostatic charge removing functions, simultaneously with the removal of dust clinging to the light guide member or the mirror, electrostatic charges occurring on the light guide member or the mirror can be removed. Therefore, the light guide member or the mirror can be prevented from attracting dust.

With the radiation image read-out apparatus in accordance with the present invention, wherein the mirror can be rotated arbitrarily by the user when necessary, the operation for removing dust can be performed when the user judges that the light guiding efficiency has become low due to dust. Also, with the radiation image read-out apparatus in accordance with the present invention, wherein the mirror body rotates automatically when predetermined conditions are satisfied, the state of the light guide member and the state of the mirror can always be set at predetermined state.

With the radiation image read-out apparatus in accordance with the present invention, wherein the first gear and the second gear are provided and the first gear is provided with the toothless region for preventing the mirror body from undergoing over-rotation, in cases where the second gear rotates excessively, the engagement of the first gear with the second gear is released by the toothless region of the first gear. Therefore, the problems can be prevented from occurring in that the mirror body comes into contact with peripheral parts, and the like, due to over-rotation of the first gear and causes shifting in position and breakage of the parts.

With the radiation image read-out apparatus in accordance with the present invention, wherein the second gear is provided with the toothless region for releasing engagement of the second gear with the first gear, when the first gear is in the non-engagement state with the toothless region of the second gear, the mirror body can be rotated freely. In this state, for example, the mirror body can be caused to abut with a stopper and can thereby be accurately set at the initial position.

With the radiation image read-out apparatus in accordance with the present invention, wherein the interlocking circuit for cutting off the driving force, which rotates the second gear, in accordance with the results of the detection of the position of rotation of the second gear and the detection of the direction of rotation of the second gear is provided, over-rotation of the second gear can be ceased. Therefore, the problems can be prevented from occurring in that the mirror body connected to the first gear, which rotates accompanying the rotation of the second gear, comes into contact with peripheral parts, and the like, and causes shifting in position and breakage of the parts.

BRIEF DESCRIPTION OF THE DRAWINGS

FIGS. 8A and 8B are explanatory views showing how the over-rotation of the mirror body is prevented by the toothless region of the mirror body gear, FIG. 9 is a block diagram showing an interlocking circuit.

DESCRIPTION OF THE PREFERRED EMBODIMENTS

The present invention will hereinbelow be described in further detail with reference to the accompanying drawings.

Figure 1:
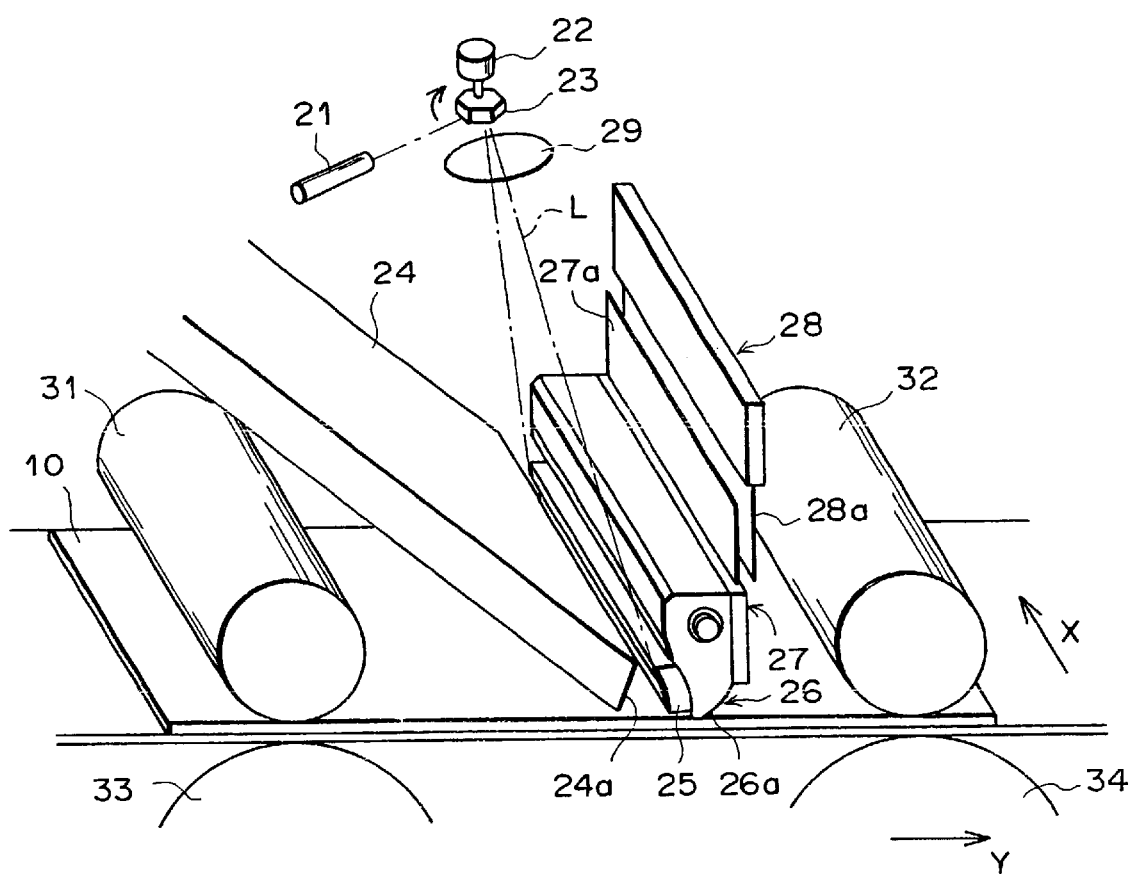
FIG. 1 is a perspective view showing an embodiment of the radiation image read-out apparatus in accordance with the present invention.
Figure 2:
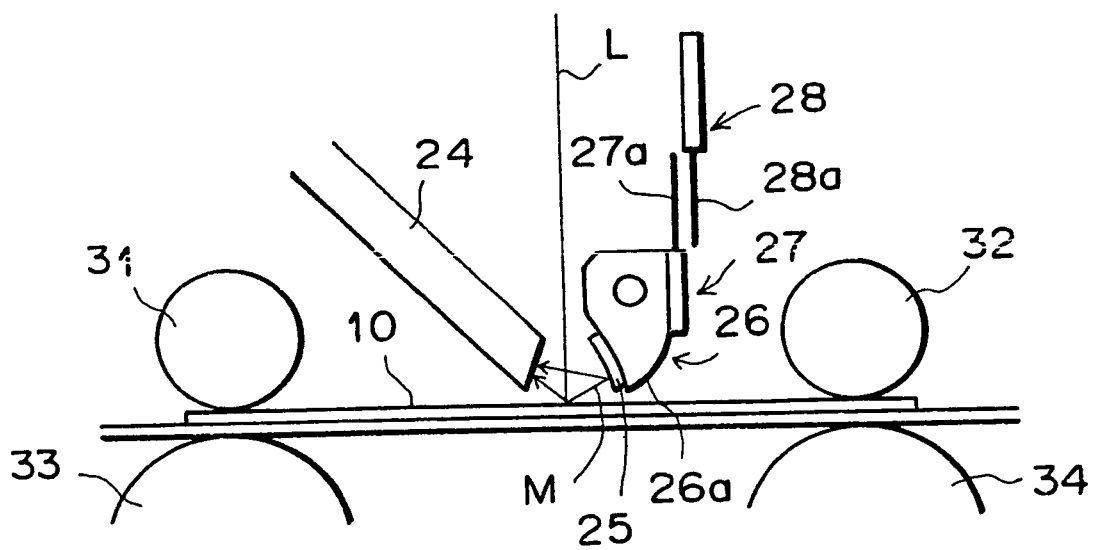
FIG. 2 is a side view of the embodiment of FIG. 1.
Figure 3:
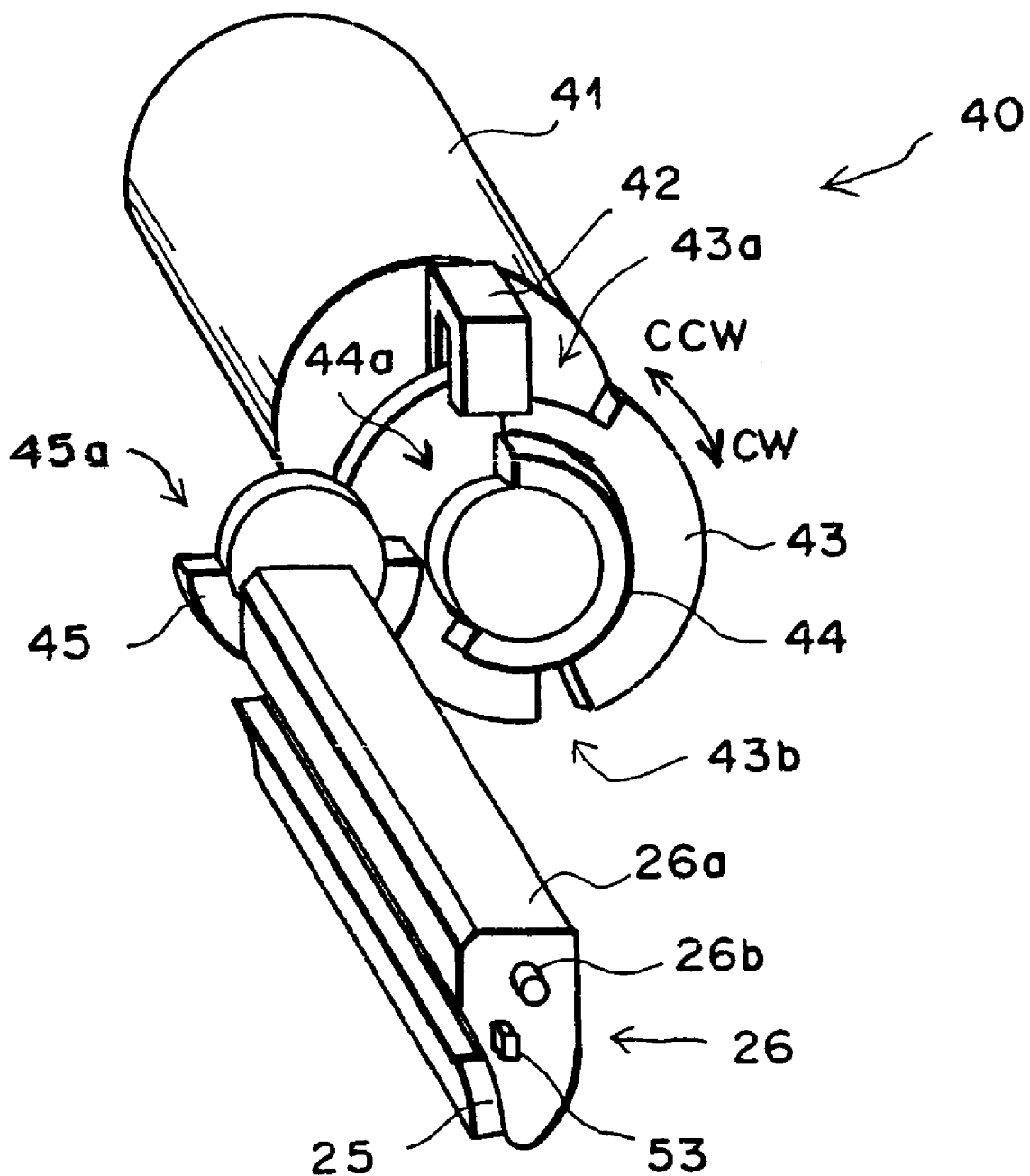
FIG. 3 is a perspective view showing a mirror body and a driving section for the mirror body.
Figure 4:
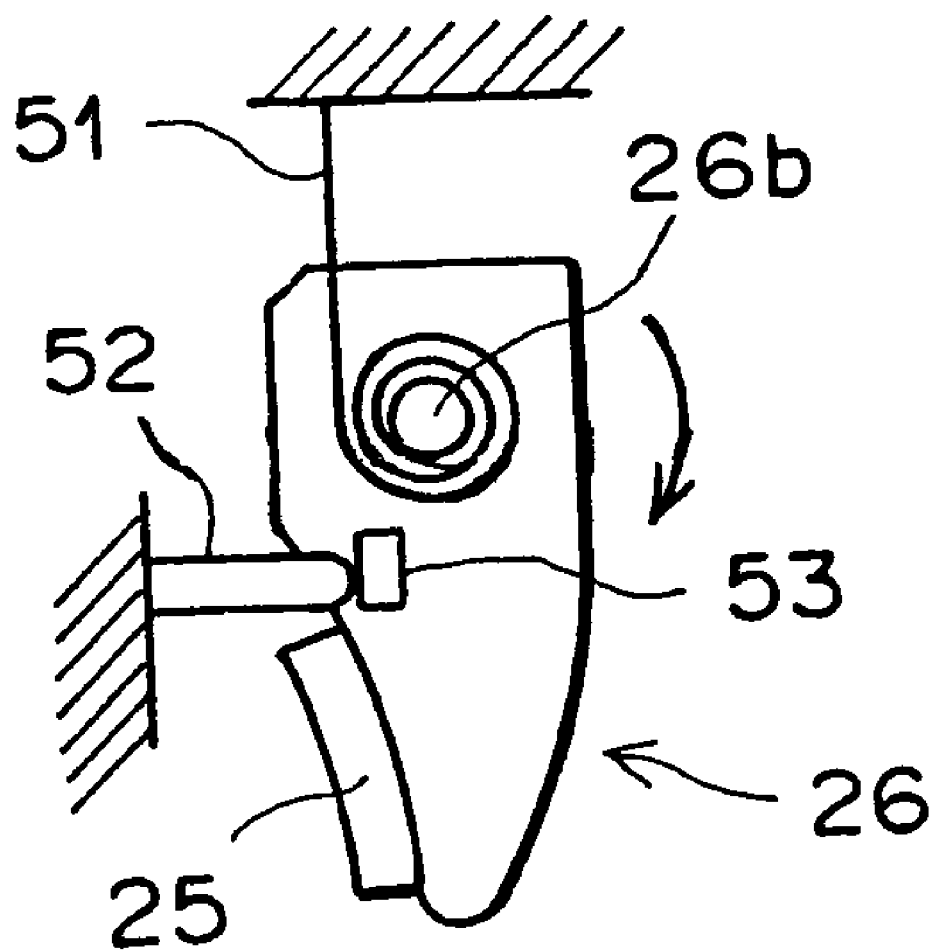
FIG. 4 is an enlarged side view showing an end face of the mirror body.

FIG. 1 is a perspective view showing an embodiment of the radiation image read-out apparatus in accordance with the present invention. FIG. 2 is a side view of the embodiment of FIG. 1. FIG. 3 is a perspective view showing a mirror body and a driving section for the mirror body. FIG. 4 is an enlarged side view showing an end face of the mirror body.

The embodiment of the radiation image read-out apparatus in accordance with the present invention comprises a stimulating ray irradiation system and a light guiding system. The stimulating ray irradiation system comprises a laser beam source 21 for producing a laser beam L having predetermined wavelengths, and a rotating polygon mirror 23 for reflecting and deflecting the laser beam L, which has been produced by the laser beam source 21, and causing the laser beam L to scan a stimulable phosphor sheet 10 along a main scanning direction indicated by the arrow X. The stimulating ray irradiation system also comprises a motor 22 for rotating the rotating polygon mirror 23, and a scanning lens 29 for converging the laser beam L, which has been reflected and deflected by the rotating polygon mirror 23, onto the stimulable phosphor sheet 10 and causing the laser beam L to scan at uniform speed. The light guiding system comprises a light guide member 24 for guiding light M emitted by the stimulable phosphor sheet 10, and a mirror 25, which extends along the main scanning direction of the laser beam L, and which reflects the emitted light M to guide it toward a light input face 24a of the light guide member 24. The radiation image read-out apparatus also comprises a photomultiplier (PMT) (not shown) for amplifying the emitted light M, which has been guided by the light guiding system, and photoelectrically converting the emitted light M into an electric image signal. The radiation image read-out apparatus further comprises a sheet conveyor for conveying the stimulable phosphor sheet 10 in the direction indicated by the arrow Y. The sheet conveyor is constituted as a belt conveyor provided with conveying rollers 31, 32, 33, and 34.

The mirror 25, which extends along the main scanning direction of the laser beam L indicated by the arrow X, is located in the vicinity of the light input face 24a of the light guide member 24 so as to stand facing the light input face 24a. The mirror 25 is mounted on a mirror mount 26a. The mirror 25 and the mirror mount 26a constitute a mirror body 26. The mirror body 26 is provided with a light guide member dust removing brush 27, which is located at a position that does not interfere with the laser beam L. The light guide member dust removing brush 27 has a brush part 27a. Also, a mirror dust removing brush 28 is mounted on a support member (not shown), such as an apparatus case housing. The mirror dust removing brush 28 has a brush part 28a located so as to stand facing the brush part 27a.

As illustrated in FIG. 3, a mirror body gear 45 (not shown in FIG. 1 and FIG. 2), which acts as a first gear, is connected to one end of the mirror body 26 with respect to the main scanning direction indicated by the arrow X. The mirror body gear 45 has a toothless region 45a, which will be described later. When a dust removing process is to be performed, the mirror body gear 45 is coupled with a driving section 40, which rotates the mirror body 26. When an operation for reading out radiation image information is to be performed, the coupling of the mirror body gear 45 with the driving section 40 is released. The driving section 40 comprises a driving gear 44, which acts as a second gear and has a toothless region 44a for releasing gear engagement such that the position of the mirror 25 can be set at a predetermined position. The driving section 40 also comprises a circular plate 43, which is co-axially connected to the driving gear 44. The circular plate 43 is provided with a shallow cutaway region 43a and a deep cutaway region 43b. The driving section 40 further comprises a limit sensor 42, which is provided with a light projector and a light receiver. The limit sensor 42 detects the state, in which light having been radiated out from the light projector passes through the cutaway region 43a or the cutaway region 43b of the circular plate 43 and is received by the light receiver, and the state, in which the light having been radiated out from the light projector is intercepted by the circular plate 43. The driving section 40 still further comprises a DC motor with speed reducer 41 having a rotation shaft, with which the driving gear 44 and the circular plate 43 are coupled. The DC motor with speed reducer 41 thus rotates the driving gear 44 and the circular plate 43. The side faces of the mirror body 26 with respect to the main scanning direction indicated by the arrow X are provided with mirror body support bosses 26a, 26a for supporting the mirror body 26 such that it can rotate. As illustrated in FIG. 4, a torsion spring 51 is wound around the mirror body support boss 26b, which is located on one side face of the mirror body 26. As illustrated in FIG. 4, the torsion spring 51 urges the mirror body 26 toward the direction of rotation indicated by the arrow. The mirror body 26 is also provided with an abutment pin receiver 53 for setting the mirror 25 at the predetermined position. The abutment pin receiver 53 receives an abutment pin 52, which is secured to an appropriate support member located on the side outward from the main scanning range of the laser beam L such that the support member may not intercept the laser beam L.

At the time at which the light having been radiated out from the light projector of the limit sensor 42 passes through the cutaway region 43a or the cutaway region 43b of the circular plate 43 and is received by the light receiver of the limit sensor 42, the limit sensor 42 outputs an open value signal (0V) and/or an enable signal. At the time at which the light having been radiated out from the light projector of the limit sensor 42 is intercepted by the circular plate 43, the limit sensor 42 outputs a close value signal (+5V). Specifically, the limit sensor 42 has a light sensor, which detects a shallow cutaway position, and a light sensor, which detects a deep cutaway position. The limit sensor 42 can thus discriminate the shallow cutaway region 43a and the deep cutaway region 43b from each other. When the shallow cutaway region 43a passes through the limit sensor 42, the limit sensor 42 outputs the open value signal (0V), which represents that the shallow cutaway position has been detected. When the deep cutaway region 43b passes through the limit sensor 42, the limit sensor 42 outputs the enable signal, which represents that the deep cutaway position has been detected, and the open value signal (0V), which represents that the shallow cutaway position has been detected.

The DC motor with speed reducer 41 rotates in the clockwise direction or the counter-clockwise direction by receiving an electric current from a DC motor driver 61, which will be described later. The DC motor driver 61 receives a clockwise rotation signal (CW signal) or a counter-clockwise rotation signal (CCW signal) from a control section (not shown).

The embodiment of the radiation image read-out apparatus in accordance with the present invention operates will be described hereinbelow.

The laser beam L having predetermined wavelengths is produced by the laser beam source 21. The laser beam L, which has been produced by the laser beam source 21, is deflected in the predetermined direction by the rotating polygon mirror 23, which is being rotated quickly by the motor 22. The deflected laser beam L is converged by the scanning lens 29 onto the surface of the stimulable phosphor sheet 10 via the spacing between the light guide member 24 and the mirror 25. The laser beam L is also caused to repeatedly scan the stimulable phosphor sheet 10 at uniform speed and in the main scanning direction indicated by the arrow X. While the stimulable phosphor sheet 10 is thus being scanned in the main scanning direction indicated by the arrow X, the stimulable phosphor sheet 10 is moved in the sub-scanning direction, which is indicated by the arrow Y, by the sheet conveyor provided with the conveying rollers 31, 32, 33, and 34. By the combination of the main scanning and the sub-scanning, the entire area of the stimulable phosphor sheet 10 is uniformly exposed to the laser beam L.

When the stimulable phosphor sheet 10 is exposed to the laser beam L, the exposed portion emits the light M in proportion to the amount of energy stored thereon during its exposure to radiation. The light M emitted by the stimulable phosphor sheet 10 diffuse in various directions. Part of the emitted light M directly impinges upon the light input face 24a of the light guide member 24. Part of the emitted light M is reflected by the mirror 25 and then impinges upon the light input face 24a of the light guide member 24. The emitted light M impinging upon the light guide member 24 is guided through the light guide member 24 and transferred to the PMT. The PMT amplifies the emitted light M, photoelectrically converts it into an image signal, and feeds the image signal into an external signal processing unit.

The process for removing dust clinging to the light guiding system will be described hereinbelow.

After the operation for reading out the radiation image information from the entire area of the stimulable phosphor sheet 10 has been finished and the stimulable phosphor sheet 10 leaves the position in the vicinity of the light guiding system, or before the operation for reading out the radiation image information from the stimulable phosphor sheet 10 is begun, the user arbitrarily gives an instruction for removing dust from the light guiding system when necessary. In accordance with the instruction, the DC motor with speed reducer 41 of the driving section 40 is activated, and the circular plate 43 and the driving gear 44 connected to the circular plate 43 starts the rotation in the clockwise direction (i.e., the CW direction indicated by the arrow in FIG. 3). While the driving gear 44 is thus rotating, it comes into engagement with the mirror body gear 45, and the mirror body 26 rotates accompanying the rotation of the mirror body gear 45. When the driving gear 44 and the circular plate 43 have rotated by an angle of approximately 180 degrees, the light signal at the limit sensor 42, which light signal has been intercepted by the circular plate 43, passes through the deep cutaway region 43b of the circular plate 43 and is received by the light receiver of the limit sensor 42. As a result, the open value signal is fed from the limit sensor 42 into the control section. The control section receives the open value signal and feeds out a stop signal. The rotation of the DC motor with speed reducer 41 is ceased with the stop signal, and the rotation of the driving gear 44 is ceased. FIGS. 5A, 5B, 5C, 5D, and 5E show how the light guide member dust removing brush 27 and the mirror dust removing brush 28 operate between when the rotation of the driving gear 44 starts and when the driving gear 44 has rotated by an angle of approximately 180 degrees.

Figure 5A:
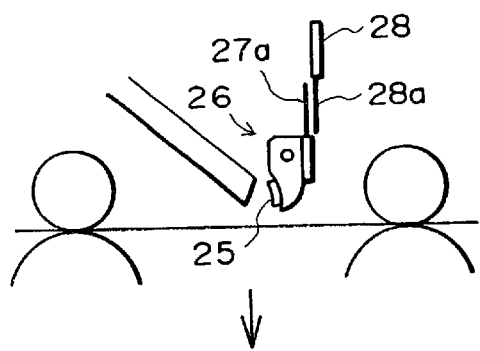
FIGS. 5A, 5B, 5C, 5D, and 5E are explanatory views showing how a light guide member dust removing brush and a mirror dust removing brush operate between when the mirror body is set at an initial position and when the mirror body has rotated by an angle of approximately 180 degrees from the initial position.
Figure 5B:
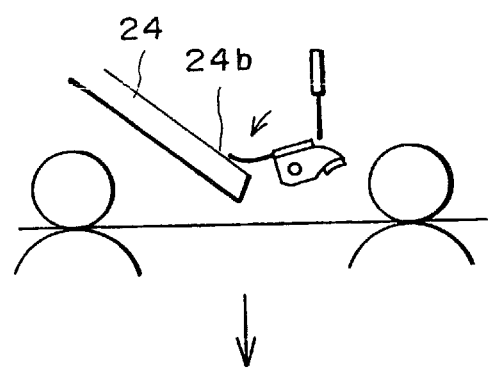
Figure 5C:
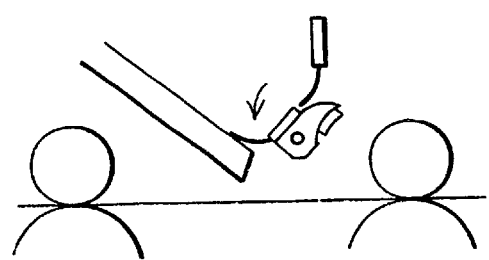
Figure 5D:
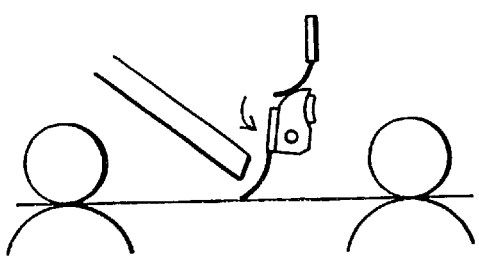
Figure 5E:
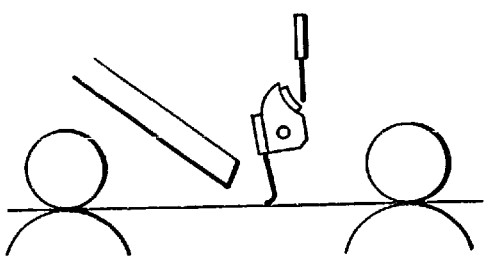

As illustrated in FIGS. 5A and 5B, from the initial position shown in FIG. 5A at which the driving gear 44 and the mirror body gear 45 are not engaged with each other, the mirror body 26 rotates in the counter-clockwise direction indicated by the arrow in FIG. 5B. As illustrated in FIGS. 5B and 5C, the brush part 27a of the light guide member dust removing brush 27, which is mounted on the mirror body 26, comes into contact with an upper surface 24b of the light guide member 24 and wipes off dust clinging to the upper surface 24b. Thereafter, as illustrated in FIGS. 5D and 5E, as the mirror body 26 continues to rotate in the direction indicated by the arrow, the brush part 28a of the mirror dust removing brush 28, which is located to stand facing the brush part 27a, comes into contact with the mirror 25 and wipes off dust clinging to the mirror 25. As illustrated in FIG. 5E, after the mirror body 26 has rotated by an angle of approximately 180 degrees from the initial position, the rotation of the mirror body 26 is ceased.

After the rotation of the DC motor with speed reducer 41 is ceased, the CCW signal is fed out from the control section, and the DC motor with speed reducer 41 begins rotating in the counter-clockwise direction, i.e. in the CCW direction indicated by the arrow in FIG. 3. The driving gear 44 is thus rotated, and the mirror body gear 45 interlocked with the driving gear 44 rotates. When the mirror body gear 45 has rotated in engagement with the driving gear 44 up to the position of the toothless region 44a of the driving gear 44, the mirror body gear 45 is released from the engagement with the driving gear 44. Thereafter, the circular plate 43 continues to rotate till the light receiver of the limit sensor 42 receives the light signal projected from the light projector of the limit sensor 42. At the time at which the circular plate 43 has rotated by an angle of approximately 180 degrees in the counter-clockwise direction, the light signal passing through the shallow cutaway region 43a is received by the light receiver of the limit sensor 42. As a result, the open value signal is fed into the control section, and the rotation of the DC motor with speed reducer 41 is ceased. When the mirror body 26 is released from the engagement with the mirror body gear 45, the rotation of the mirror body 26 accompanying the rotation of the mirror body gear 45 is ceased, and the position of the mirror body 26 is set by the effects of the abutment pin receiver 53 of the mirror body 26, the abutment pin 52, and the torsion spring 51. Specifically, the mirror body 26 is urged by the torsion spring 51 toward the direction shown in FIG. 4, and the abutment pin receiver 53 of the mirror body 26 abuts against the abutment pin 52. In this manner, the position of the mirror 25 is accurately set at the initial position. FIGS. 6A, 6B, 6C, 6D, and 6E show how the light guide member dust removing brush 27 and the mirror dust removing brush 28 operate between when the mirror body 26 has rotated by an angle of approximately 180 degrees from the initial position and when the mirror body 26 has returned to the initial position.

Figure 6A:
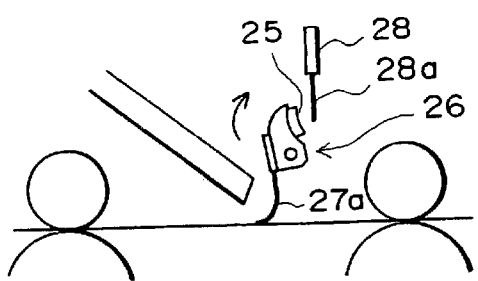
FIGS. 6A, 6B, 6C, 6D, and 6E are explanatory views showing how the light guide member dust removing brush and the mirror dust removing brush operate between when the mirror body has rotated by an angle of approximately 180 degrees from the initial position and when the mirror body has returned to the initial position.
Figure 6B:
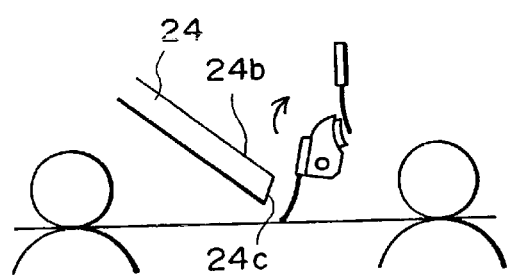
Figure 6C:
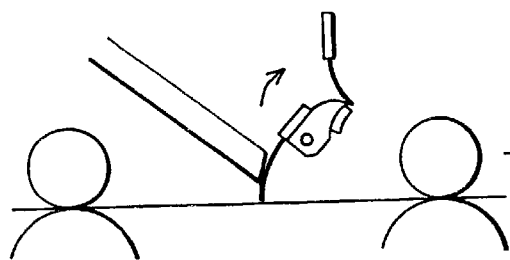
Figure 6D:
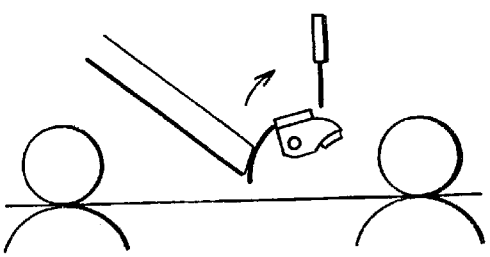
Figure 6E:
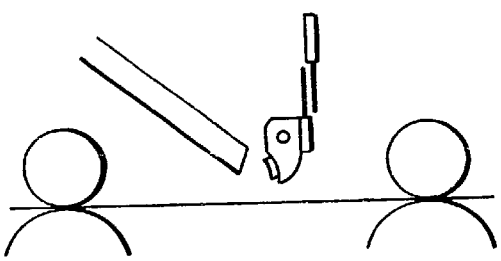

As illustrated in FIGS. 6A, 6B, 6C, 6D, and 6E, from the position shown in FIG. 6A to which the mirror body 26 has rotated by an angle of approximately 180 degrees from the initial position, the mirror body 26 rotates in the clockwise direction indicated by the arrow to the initial position shown in FIG. 6E. As illustrated in FIGS. 6B, 6C, and 6D, the brush part 27a of the light guide member dust removing brush 27 comes into contact with a lower surface 24c of the light guide member 24 and wipes off dust clinging to the lower surface 24c. Also, as illustrated in FIGS. 6A, 6B, and 6C, the brush part 28a of the mirror dust removing brush 28 comes into contact with the surface of the mirror 25 and wipes off dust clinging to the mirror 25. As illustrated in FIG. 6E, when the mirror body 26 has thus rotated by an angle of approximately 180 degrees, the rotation of the mirror body 26 is ceased, the position of the mirror body 26 is again set at the initial position.

How over-rotation of the mirror body 26 is prevented by the toothless region 45a of the mirror body gear 45 will be described hereinbelow. FIGS. 7A, 7B, 7C, and 7D schematically show the mirror body 26, the limit sensor 42, the circular plate 43, the driving gear 44, and the mirror body gear 45. Particularly, the mirror body 26 is illustrated to be small such that it may not obstruct the illustration of the other constitutions. Also, such that the positions of rotation of the driving gear 44 and the mirror body gear 45 can be recognized easily, the position of rotation of the driving gear 44 is indicated by the arrow Y2, and the position of rotation of the mirror body gear 45 is indicated by the arrow Y1.

Figure 7A:
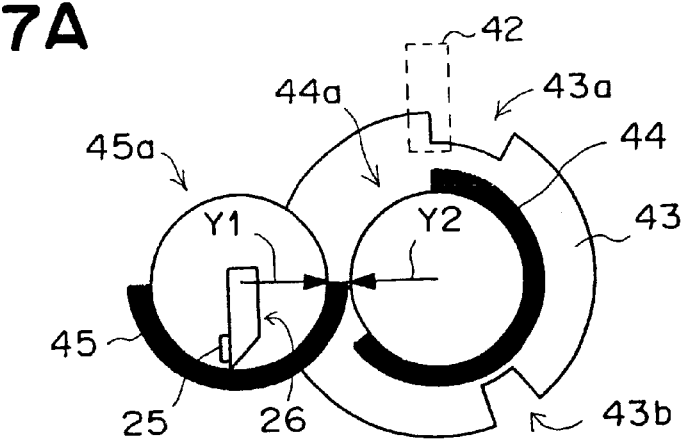
FIGS. 7A, 7B, 7C, and 7D are explanatory views showing how over-rotation of the mirror body is prevented by a toothless region of a mirror body gear.

As illustrated in FIG. 7A, in the initial state in which the radiation image information can be read out from the stimulable phosphor sheet 10, the driving gear 44 and the mirror body gear 45 are not engaged with each other. In this state, as illustrated in FIG. 4, the abutment pin 52 abuts with the abutment pin receiver 53 of the mirror body 26, and the position of the mirror body 26 is thereby set at the initial position. Also, in this state, at the driving section 40, the limit sensor 42 detects the shallow cutaway region 43a of the circular plate 43 and outputs the open value signal, and the DC motor with speed reducer 41 is not rotating. The driving gear 44 and the mirror body gear 45, which are set at the initial positions, have the rotation position relationship such that the arrow Y1 and the arrow Y2 may head toward each other.

Figure 7B:
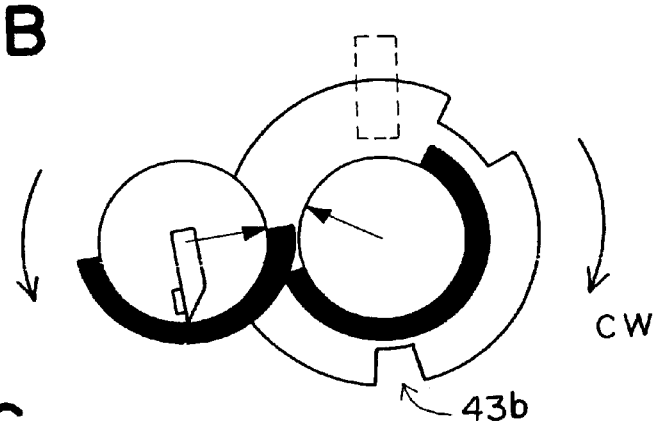
Figure 7C:
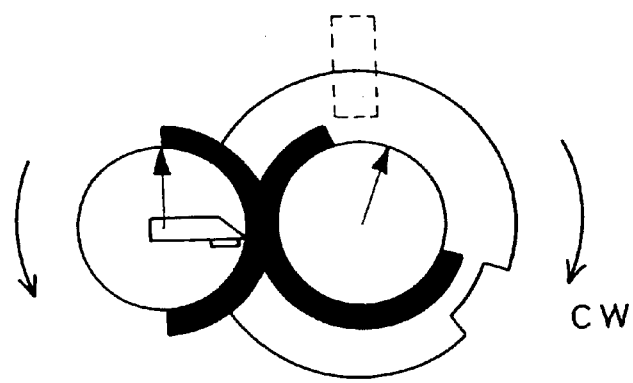
Figure 7D:
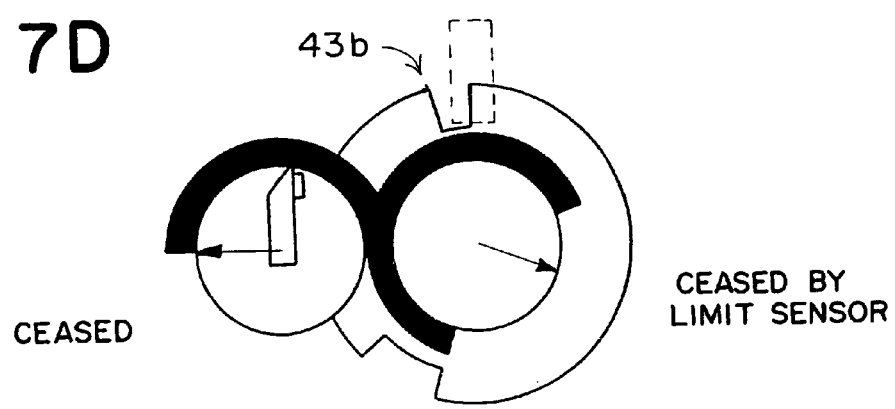

When an instruction for removing dust from the light guiding system is given, the DC motor with speed reducer 41 begins rotating, and the circular plate 43 and the driving gear 44 connected to the circular plate 43 rotate in the clockwise direction, i.e. in the CW direction indicated by the arrow in FIG. 7B. As illustrated in FIG. 7B, while the driving gear 44 is thus rotating, it comes into engagement with the mirror body gear 45 and rotates the mirror body gear 45. Also, the mirror body 26 rotates accompanying the rotation of the mirror body gear 45. As illustrated in FIG. 7D, when the driving gear 44 and the circular plate 43 have rotated by an angle of approximately 180 degrees via the state shown in FIG. 7C in which they have rotated by an angle of approximately 90 degrees, the light signal at the limit sensor 42, which light signal has been intercepted by the circular plate 43, passes through the deep cutaway region 43b of the circular plate 43 and is received by the light receiver of the limit sensor 42. As a result, the open value signal is fed from the limit sensor 42 into the control section. The control section receives the open value signal and feeds out a stop signal. The rotation of the DC motor with speed reducer 41 is ceased with the stop signal, and the rotation of the driving gear 44 is ceased. In this manner, normally, the rotation of the DC motor with speed reducer 41 and the rotation of the driving gear 44 are ceased. However, it may occur that, due to a failure of electric circuits, or the like, the DC motor with speed reducer 41 continues to rotate even further, and the driving gear 44 continues to rotate in the clockwise direction. In such cases, the mirror body gear 45 rotates even further in the counter-clockwise direction. As illustrated in FIG. 8A, the engagement between the driving gear 44 and the mirror body gear 45 is released the site of the toothless region 45a. Also, as illustrated in FIG. 8B, the driving gear 44 continues to rotate. However, at this time, since the mirror body gear 45 has been released from the engagement with the driving gear 44, the mirror body gear 45 does not rotate any more. Therefore, the problems can be prevented from occurring in that, as the mirror body gear 45 undergoes over-rotation, the mirror body 26 comes into contact with peripheral parts, and the like, and causes shifting in position and breakage of the parts.

How an interlocking circuit for cutting off the driving force for rotating the driving gear 44 operates will be described hereinbelow. Though not shown in the preceding drawings, as illustrated in FIG. 9, the embodiment of the radiation image read-out apparatus described above is provided with a DC motor driver 61, which supplies the electric current for rotating the DC motor with speed reducer 41 in the clockwise direction and the counter-clockwise direction to the DC motor with speed reducer 41, and an interlocking circuit 62, which is located midway in the circuit connecting the DC motor driver 61 and the DC motor with speed reducer 41 to each other.

The interlocking circuit 62 cuts off the electric current supplied to the DC motor with speed reducer 41 and thereby cuts off the driving force for the rotation of the driving gear 44 when the CCW signal for rotating the DC motor with speed reducer 41 in the counter-clockwise direction is outputted from the control section in cases where the enable signal is not being outputted from the limit sensor 42 and the functions of the interlocking circuit 62 are effective, i.e. in cases where the limit sensor 42 is not detecting the deep cutaway region 43b, and in addition when the condition at the limit sensor 42 changes from the state, in which the light signal projected from the light projector of the limit sensor 42 is intercepted by the circular plate 43, to the state, in which the light signal passes through the shallow cutaway region 43a and is received by the light receiver of the limit sensor 42, (i.e., when the edge of the shallow cutaway region 43a passes through the limit sensor 42 and the rising of the output of the limit sensor 42 from the open value (0V) to the close value (+5V) is detected).

Specifically, in the state shown in FIG. 7D, in which the driving gear 44 and the mirror body gear 45 have rotated by an angle of approximately 180 degrees from the initial position shown in FIG. 7A, the rotation of the DC motor with speed reducer 41 is ceased. Thereafter, the CCW signal is fed out from the control section. As a result, the DC motor with speed reducer 41 rotates in the counter-clockwise direction, and the mirror body gear 45 rotates in the clockwise direction accompanying the rotation of the driving gear 44. At this time, the limit sensor 42 detects the deep cutaway position in the deep cutaway region 43b, the enable signal is fed from the limit sensor 42 into the interlocking circuit 62, and the functions of the interlocking circuit 62 become invalid. Therefore, at this time, the interlocking circuit 62 is not actuated by the CCW signal from the control section and the rising of the output of the limit sensor 42 from the open value (0V) to the close value (+5V).

Figure 10A:
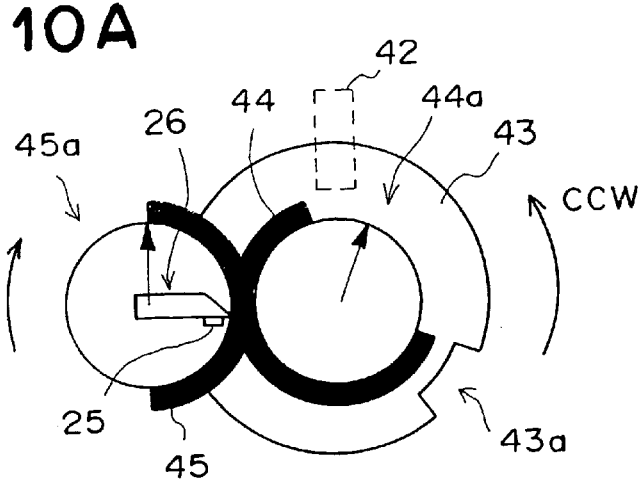
FIGS. 10A, 10B, 10C, and 10D are explanatory views showing how driving force is cut off by the interlocking circuit.
Figure 10B:
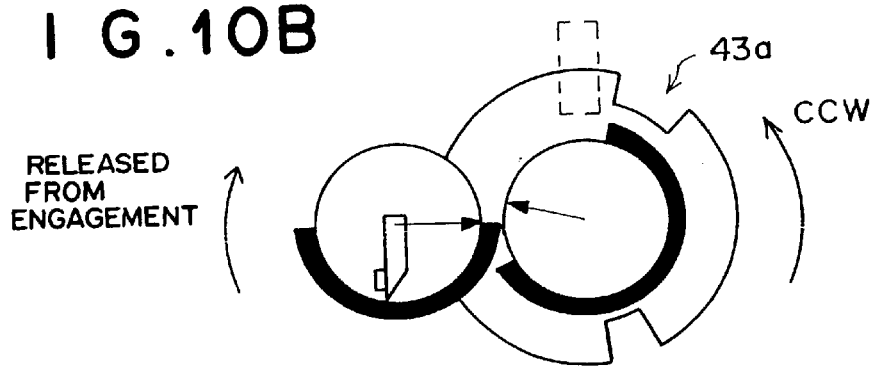
Figure 10C:
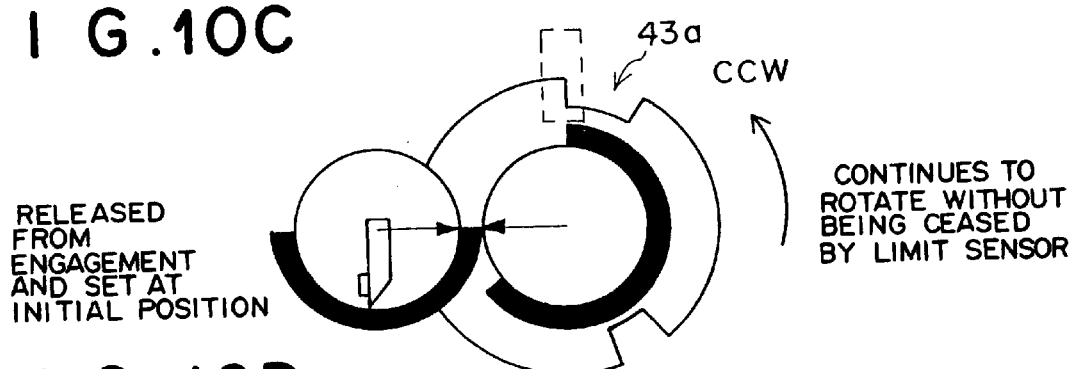
Figure 10D:
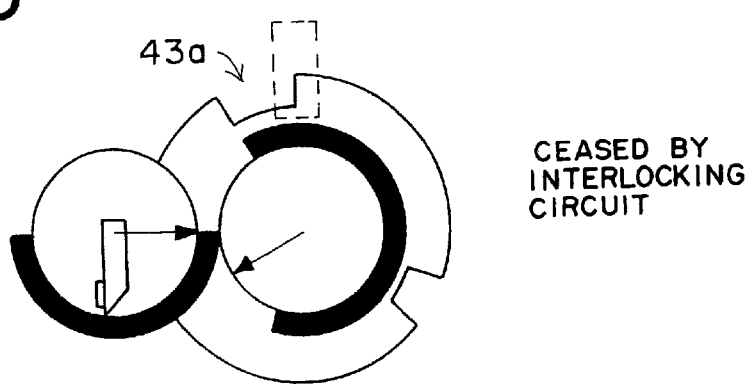

As illustrated in FIG. 10B, when the mirror body gear 45 has rotated in engagement with the driving gear 44 up to the position of the toothless region 44a of the driving gear 44 via the state shown in FIG. 10A in which the driving gear 44 and the mirror body gear 45 have rotated by an angle of approximately 90 degrees, the mirror body gear 45 is released from the engagement with the driving gear 44. Also, the position of the mirror body 26 is set at the initial position by the effects of the abutment pin receiver 53 of the mirror body 26, the abutment pin 52, and the torsion spring 51. Further, the driving gear 44 continues to rotate, the light signal passing through the shallow cutaway region 43a is received by the light receiver of the limit sensor 42, and the open value signal is fed from the limit sensor 42 into the control section. Therefore, normally, the driving gear 44 stops in the state shown in FIG. 10C. However, it may occur that, due to a failure of electric circuits, or the like, the DC motor with speed reducer 41 continues to rotate even further in the counter-clockwise direction. In such cases, the position of the shallow cutaway region 43a shifts even further in the counter-clockwise direction. Also, as illustrated in FIG. 10D, the light signal projected by the light projector of the limit sensor 42 is again intercepted by the circular plate 43. When the rising signal occurring at this time is detected and outputted from the limit sensor 42, i.e. when the interlocking circuit 62 detects both the CCW signal fed out from the control section and the signal representing the rising of the output of the limit sensor 42 from the open value (0V) to the close value (+5V), the electric current supplied from the DC motor driver 61 to the DC motor with speed reducer 41 is cut off by the interlocking circuit 62, and the counter-clockwise rotation of the driving gear 44 is ceased. Therefore, the problems can be prevented from occurring in that, the driving gear 44 undergoes counter-clockwise over-rotation, again comes into engagement with the mirror body gear 45, and transmits the rotation force to the mirror body gear 45. As a result, the abutment pin receiver 53 and the abutment pin 52 for the setting of the position of the mirror body 26, and the like, can be prevented from breaking. In the cases described above, since the limit sensor 42 corresponds to the position other than the deep cutaway region 43b, the enable signal is not being outputted from the limit sensor 42, and the functions of the interlocking circuit 62 are effective.

With the aforesaid embodiment of the radiation image read-out apparatus in accordance with the present invention, dust clinging to the light guiding system can be removed easily. Therefore, the light emitted by the stimulable phosphor sheet 10 in proportion to the amount of energy stored thereon during its exposure to radiation can be detected accurately. Also, it is unnecessary to perform particular operations for dust removal, such as disassembling and adjustment of the radiation image read-out apparatus, and the maintainability can be enhanced.

Specifically, since the light guide member dust removing brush 27, which rotates due to the rotation of the mirror body 26 and removes dust clinging to the light guide member 24, is provided, dust which intercepts the optical path of the stimulating rays can be removed forcibly, and the dust removal can be performed reliably. In this manner, the optical path of the stimulating rays can be kept free from adverse effects of dust. Therefore, a predetermined level of stimulation energy can be given to the stimulable phosphor sheet 10, and the stimulable phosphor sheet 10 can be caused to accurately emit the light M in proportion to the amount of energy stored thereon during its exposure to radiation. Also, since dust is removed by the light guide member dust removing brush 27 and the mirror dust removing brush 28, it is unnecessary for the radiation image read-out apparatus to be disassembled for dust removal. This feature is advantageous for keeping the accuracy of the radiation image read-out apparatus. Further, time required to disassemble and assemble the radiation image read-out apparatus for dust removal can be avoided, and therefore the operating efficiency of the radiation image read-out apparatus can be kept high.

In the embodiment described above, when the instruction for dust removal is given by the user to instruction means (not shown), the driving section 40 operates in accordance with the given instruction and performs the dust removing process. Alternatively, a program may be incorporated in the radiation image read-out apparatus, such that the dust removing process may be performed automatically when predetermined conditions are satisfied, e.g. immediately after the operation of the radiation image read-out apparatus begins or with an appropriate timing.

Figure 11:
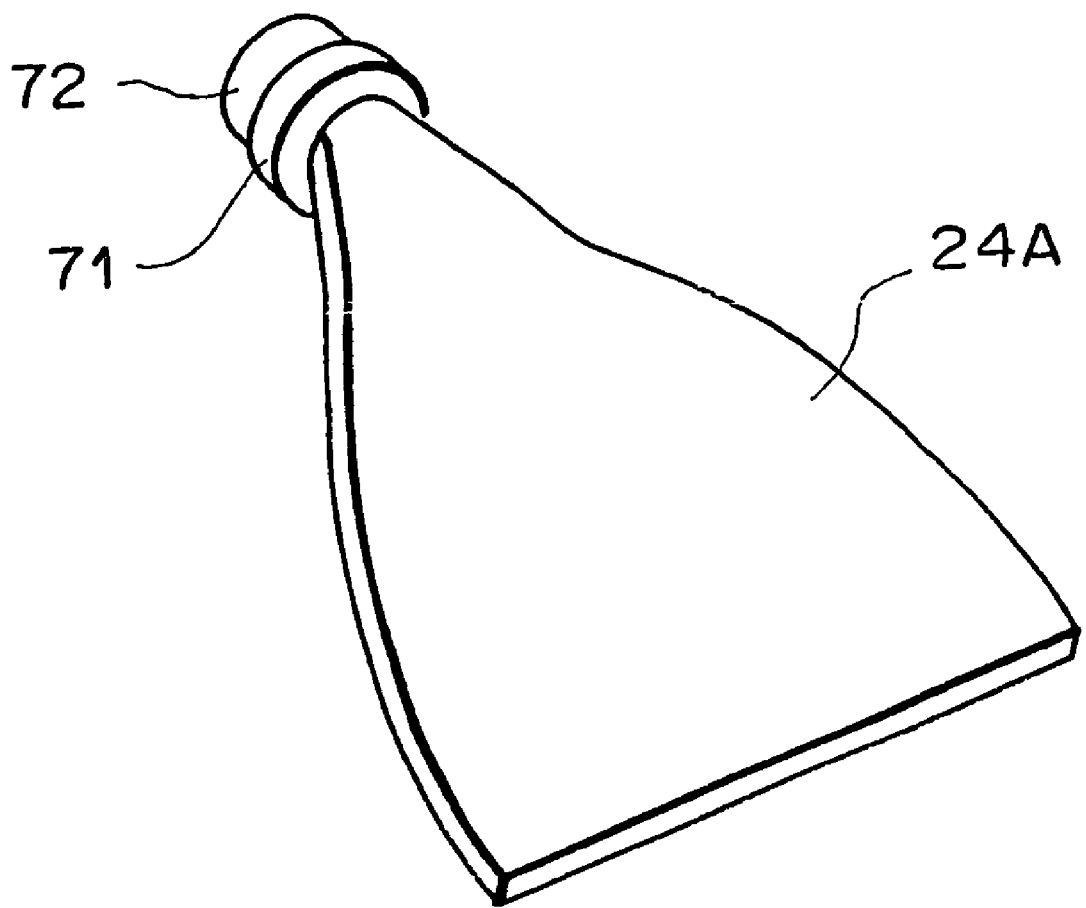
FIG. 11 is a perspective view showing a light guide member formed from a light guiding material.

The light guide member 24 may take on the form of a light guide member 24A shown in FIG. 11. The light guide member 24A is formed from a light guiding material, such as an acrylic plate. The light guide member 24A has a light input face formed as a rectangular opening and a light output face formed as a ring-shaped opening. Alternatively, the light guide member 24 may taken on the form of a light guide member 24B shown in FIGS. 12A and 12B. The light guide member 24B is provided with the rectangular opening area constituted of an array of a plurality of microlenses or SELFOC lenses.

As illustrated in FIG. 11, in cases where the light guide member 24A formed from the light guiding material is employed, the emitted light impinging upon the light input face of the light guide member 24A is guided through repeated total reflection inside of the light guide member 24A to the light output face. The guided light passes through a stimulating ray cut-off filter 71 and is detected by a photomultiplier (PMT) 72, which acts as photoelectric conversion means.

Figure 12A:
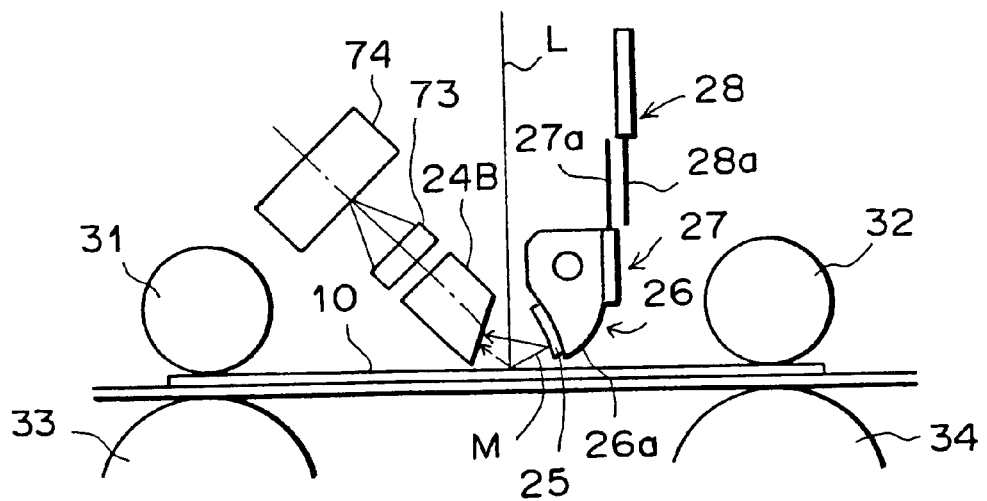
FIG. 12A is a side view showing an embodiment of the radiation image read-out apparatus in accordance with the present invention, in which a light guide member constituted of an array of microlenses is employed.
Figure 12B:
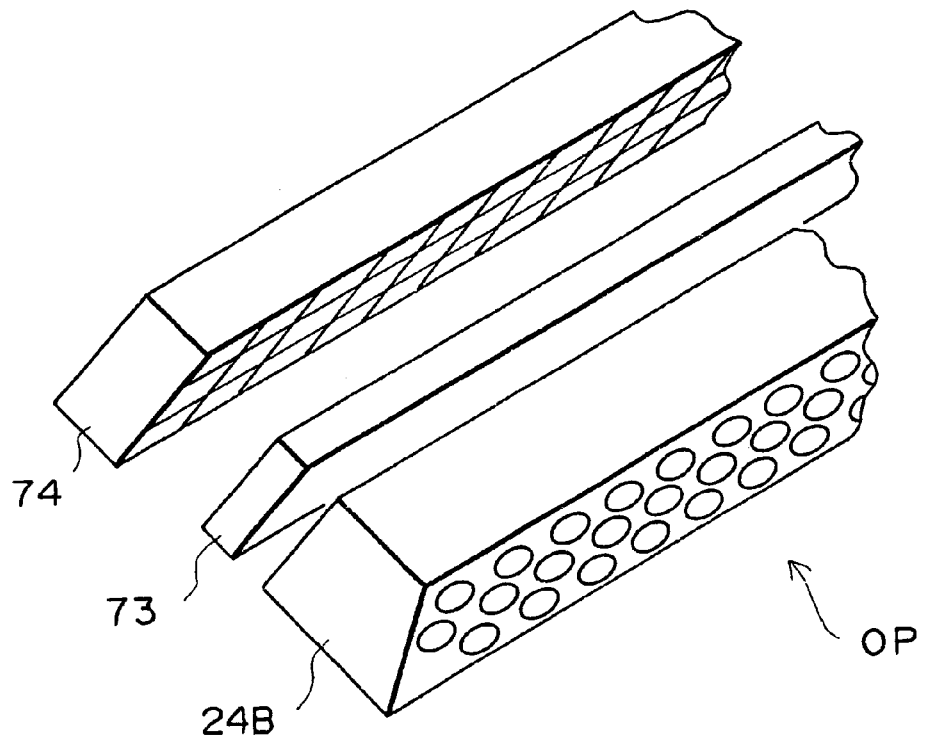
FIG. 12B is a perspective view showing the light guide member constituted of the array of microlenses.

As illustrated in FIGS. 12A and 12B, in cases where the light guide member 24B constituted of the array of the plurality of microlenses or SELFOC lenses is employed, the emitted light impinging upon the rectangular opening area Op of the light guide member 24B passes through a rectangular stimulating ray cut-off filter 73 and is detected by photoelectric conversion means 74. The photoelectric conversion means 74 may be constituted of a rectangular charge coupled device (CCD) image sensor or a semiconductor sensor constituted of amorphous selenium (a-Se), or the like.

What is claimed is:

1. A radiation image read-out apparatus, comprising:
   i) means for irradiating stimulating rays to a stimulable phosphor sheet, on which radiation image information has been stored, the stimulating rays causing the stimulable phosphor sheet to emit light in proportion to the amount of energy stored thereon during its exposure to radiation,
   ii) a light guiding system, which is provided with a light guide member and a mirror and which guides the light emitted by the stimulable phosphor sheet, and
   iii) means for detecting the guided light and thereby reading out the radiation image information,
   wherein a mirror body, which is provided with the mirror, is constituted such that it is capable of rotating, and
   the mirror body is provided with a light guide member dust removing brush, which rotates due to rotation of the mirror body, comes into contact with the light guide member, and removes dust clinging to the light guide member.

2. An apparatus as defined in claim 1 wherein the light guide member dust removing brush has electrostatic charge removing functions.

3. An apparatus as defined in claim 1 further comprising a mirror dust removing brush, which comes into contact with the mirror due to rotation of the mirror body and removes dust clinging to the mirror.

4. An apparatus as defined in claim 2 further comprising a mirror dust removing brush, which comes into contact with the mirror due to rotation of the mirror body and removes dust clinging to the mirror.

5. An apparatus as defined in claim 3 wherein the mirror dust removing brush has electrostatic charge removing functions.

6. An apparatus as defined in claim 4 wherein the mirror dust removing brush has electrostatic charge removing functions.

7. An apparatus as defined in claim 1, 2, 3, 4, 5, or 6 wherein the mirror body is capable of being rotated arbitrarily.

8. An apparatus as defined in claim 1, 2, 3, 4, 5, or 6 wherein the mirror body is capable of being rotated automatically when predetermined conditions are satisfied.

9. An apparatus as defined in claim 1, 2, 3, 4, 5, or 6 wherein the apparatus is provided with a first gear, which is connected to the mirror body and rotates the mirror body, and a second gear for engagement with the first gear, which second gear is connected to a rotation driving shaft and transmits rotation force to the first gear, and
   the first gear is provided with a toothless region for preventing the mirror body from undergoing over-rotation.

10. An apparatus as defined in claim 1, 2, 3, 4, 5, or 6 wherein the apparatus is provided with a first gear, which is connected to the mirror body and rotates the mirror body, and a second gear for engagement with the first gear, which second gear is connected to a rotation driving shaft and transmits rotation force to the first gear, and the second gear is provided with a toothless region for releasing engagement of the second gear with the first gear when the mirror body takes a position in the vicinity of an initial position.

11. An apparatus as defined in claim 9 wherein the second gear is provided with a toothless region for releasing engagement of the second gear with the first gear when the mirror body takes a position in the vicinity of an initial position.

12. An apparatus as defined in claim 10 further comprising rotation position detecting means for detecting a position of rotation of the second gear, rotation direction detecting means for detecting a direction of rotation of the second gear, and an interlocking circuit for cutting off driving force, which rotates the second gear, in accordance with the results of the detection of the position of rotation of the second gear and the detection of the direction of rotation of the second gear.

13. An apparatus as defined in claim 11 further comprising rotation position detecting means for detecting a position of rotation of the second gear, rotation direction detecting means for detecting a direction of rotation of the second gear, and an interlocking circuit for cutting off driving force, which rotates the second gear, in accordance with the results of the detection of the position of rotation of the second gear and the detection of the direction of rotation of the second gear.

* * * * *